(12) United States Patent
Iwamura et al.

(10) Patent No.: US 10,097,567 B2
(45) Date of Patent: Oct. 9, 2018

(54) INFORMATION PROCESSING APPARATUS AND IDENTIFYING METHOD

(71) Applicant: NIPPON TELEGRAPH AND TELEPHONE CORPORATION, Chiyoda-ku (JP)

(72) Inventors: Makoto Iwamura, Musashino (JP); Yuhei Kawakoya, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/890,058

(22) PCT Filed: Mar. 26, 2014

(86) PCT No.: PCT/JP2014/058692
§ 371 (c)(1),
(2) Date: Nov. 9, 2015

(87) PCT Pub. No.: WO2014/188780
PCT Pub. Date: Nov. 27, 2014

(65) Prior Publication Data
US 2016/0127396 A1    May 5, 2016

(30) Foreign Application Priority Data

May 20, 2013  (JP) .................................. 2013-106088

(51) Int. Cl.
*H04L 29/06* (2006.01)
*G06F 21/56* (2013.01)
*H04L 29/08* (2006.01)

(52) U.S. Cl.
CPC ........ *H04L 63/1416* (2013.01); *G06F 21/562* (2013.01); *G06F 21/566* (2013.01); *H04L 63/145* (2013.01); *H04L 67/1097* (2013.01)

(58) Field of Classification Search
CPC ... G06F 21/562; G06F 21/566; H04L 63/145; H04L 67/1097; H04L 63/1416
See application file for complete search history.

(56) References Cited

U.S. PATENT DOCUMENTS 7,870,610 B1    1/2011  Mitchell et al.
8,204,984 B1 *  6/2012  Aziz .................. H04L 63/0227
                                                          709/224

(Continued)

FOREIGN PATENT DOCUMENTS

JP  2011-257901 A  12/2011
JP  2012-83798 A    4/2012
JP  2012-234540 A  11/2012

OTHER PUBLICATIONS

Extended European Search Report dated Nov. 18, 2016 in Patent Application No. 14801488.9.

(Continued)

*Primary Examiner* — Mohammad A Siddiqi
(74) *Attorney, Agent, or Firm* — Oblon, McClelland, Maier & Neustadt, L.L.P.

(57) ABSTRACT

An information processing apparatus includes an adding unit and an identifying unit. The adding unit adds, to data received from a communication destination device by a program to be analyzed, a tag, by which the communication destination device is identifiable. If the tag has been added to data executed by a new program when an activation of or an activation reservation for the new program is detected, the identifying unit identifies the communication destination device identified by the tag.

6 Claims, 6 Drawing Sheets

(56) References Cited

U.S. PATENT DOCUMENTS

| | | |
|---|---|---|
| 8,528,086 B1 | 9/2013 | Aziz |
| 8,539,582 B1 | 9/2013 | Aziz et al. |
| 8,561,177 B1 | 10/2013 | Aziz et al. |
| 8,566,946 B1 | 10/2013 | Aziz et al. |
| 9,176,843 B1* | 11/2015 | Ismael ................. G06F 11/362 |
| 2007/0250930 A1 | 10/2007 | Aziz et al. |
| 2009/0037672 A1* | 2/2009 | Colbert ................. G06F 9/4856 |
| | | 711/154 |
| 2009/0183261 A1* | 7/2009 | Peinado ................ G06F 21/565 |
| | | 726/24 |
| 2011/0145918 A1* | 6/2011 | Jung ....................... G06F 21/52 |
| | | 726/22 |
| 2013/0055339 A1* | 2/2013 | Apostolescu ......... G06F 21/554 |
| | | 726/1 |
| 2013/0086687 A1* | 4/2013 | Chess ..................... G06F 21/53 |
| | | 726/25 |
| 2013/0117848 A1* | 5/2013 | Golshan ............... G06F 21/566 |
| | | 726/23 |
| 2013/0117849 A1* | 5/2013 | Golshan ................. G06F 21/53 |
| | | 726/23 |
| 2013/0139262 A1* | 5/2013 | Glew .................. H04L 63/1466 |
| | | 726/23 |
| 2015/0242626 A1* | 8/2015 | Wang .................... G06F 21/577 |
| | | 726/23 |
| 2016/0088007 A1* | 3/2016 | Kawakoya .............. G06F 21/52 |
| | | 726/23 |

OTHER PUBLICATIONS

International Search Report dated Jul. 1, 2014 in PCT/JP14/058692 Filed Mar. 26, 2014.

* cited by examiner

| TAINT TAG | IP VERSION | TRANSMIS- SION SOURCE ADDRESS | DESTINA- TION ADDRESS | IP PROTOCOL | TRANSMIS- SION SOURCE PORT NUMBER | DESTINA- TION PORT NUMBER |
|---|---|---|---|---|---|---|
| 1 | 4 | 192.168.0.1 | 10.0.0.1 | 6 | 80 | 10000 |
| 2 | 4 | 192.168.0.1 | 10.0.0.1 | 6 | 80 | 10001 |
| 3 | 4 | 172.16.0.1 | 10.0.0.1 | 17 | 20000 | 1434 |
| 4 | 4 | 192.168.1.1 | 10.0.0.1 | 6 | 80 | 10002 |
| 5 | 4 | 192.168.2.1 | 10.0.0.1 | 1 | - | - |
|   |   |   |   |   |   |   |

| TAINT TAG | IP VERSION | TRANSMIS- SION SOURCE ADDRESS | DESTINA- TION ADDRESS | IP PROTOCOL | TRANSMIS- SION SOURCE PORT NUMBER | DESTINA- TION PORT NUMBER |
|---|---|---|---|---|---|---|
| 1 | 4 | 192.168.0.1 | 10.0.0.1 | 6 | 80 | 10000 |
| 2 | 4 | 192.168.0.1 | 10.0.0.1 | 6 | 80 | 10001 |
| 3 | 4 | 172.16.0.1 | 10.0.0.1 | 17 | 20000 | 1434 |
| 4 | 4 | 192.168.1.1 | 10.0.0.1 | 6 | 80 | 10002 |
| 5 | 4 | 192.168.2.1 | 10.0.0.1 | 1 | - | - |
| 6 | 4 | 192.168.3.1 | 10.0.0.1 | 6 | 80 | 10003 |
|   |   |   |   |   |   |   |

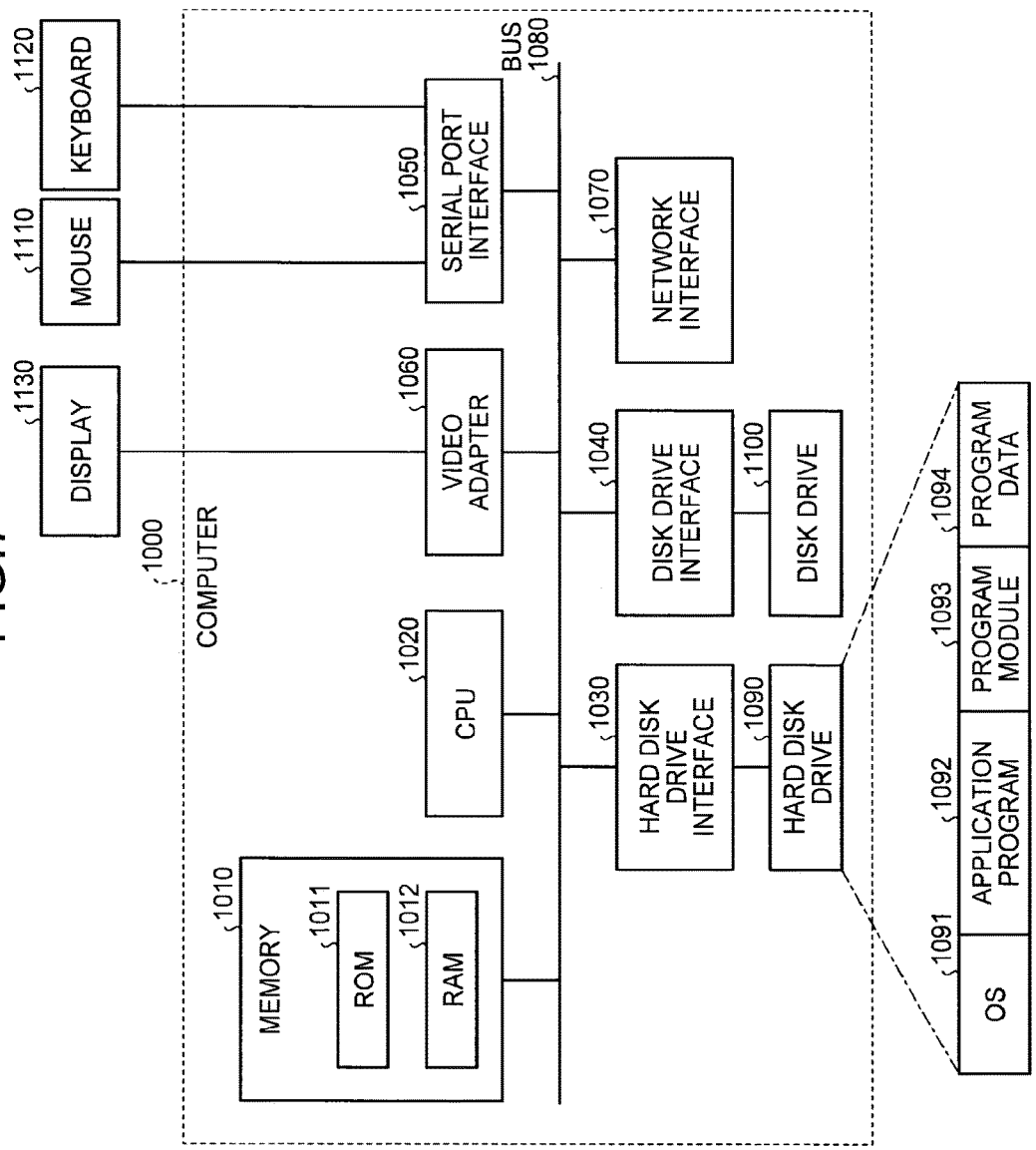

INFORMATION PROCESSING APPARATUS AND IDENTIFYING METHOD

FIELD

The present invention relates to an information processing apparatus and an identifying method.

BACKGROUND

Conventional techniques for analyzing malware can be broadly classified into static analysis and dynamic analysis. Static analysis is a technique for grasping functions of malware by analyzing program codes of the malware. However, in static analysis, since functions that malware has are comprehensively analyzed, a lot of manual operation is involved. Dynamic analysis is a technique for analyzing functions of malware by preparing an environment for recording behavior of the malware and causing the malware to operate in this environment. Since dynamic analysis is analysis for extracting behavior of malware, automization thereof is easier than that of static analysis.

Dynamic taint analysis is one type of such dynamic analysis of malware. In dynamic taint analysis, a virtual central processing unit (CPU) tracks, in a virtual machine, for example, flow of data read from and written into a virtual memory, a virtual disk, or the like by malware. More specifically, dynamic taint analysis is constituted of three phases, which are: addition of a taint tag; propagation of the taint tag; and detection of the taint tag.

For example, if leakage of confidential information by malware is to be detected, a virtual CPU executes the following processing. In the first phase, the virtual CPU causes the malware to operate. The virtual CPU then adds a taint tag meaning confidential information, in association with a position in a memory where a file including confidential information is stored, when the file including the confidential information is loaded into the memory. Normally, this taint tag is stored in an area (also called a "shadow memory") prepared separately from a physical memory managed by an operating system (OS). This area is implemented to be inaccessible from the OS and applications (including malware).

Thereafter, in the second phase, by the virtual CPU monitoring transfer instructions and the like between a register and a memory area, the taint tag is propagated according to copying of the confidential information. In the third phase, the virtual CPU checks whether the taint tag meaning confidential information has been added to data to be output from a network interface. If the taint tag has been added to the data to be output, the virtual CPU detects that the confidential information has been attempted to be output outside.

Further, a technique for realizing a breakpoint in a debugger by a taint tag is an example to which dynamic taint analysis is applied. With this technique, a taint tag is assigned beforehand by a user to a position (a position where a "breakpoint" is set) at which a program is desired to be interrupted. A virtual CPU then inspects whether a taint tag has been added in association with an instruction to be executed, and if the taint tag has been added, the virtual CPU interrupts the program.

CITATION LIST

Patent Literature

Patent Literature 1: Japanese Patent Application Publication No. 2012-83798

SUMMARY

Technical Problem

However, the above described conventional techniques have a problem that distribution destinations of the malware are unable to be identified.

For example, interrupting communication by malware in a network is expected to have an effect of suppressing damage by the malware. Communication destinations of malware obtained in dynamic analysis include various hosts, in addition to destinations to which information in a terminal is leaked. For example, these include: a site (called a "malware distribution site") that distributes new malware; a site for confirming that the malware itself is connected to the network; and the like. A site for confirming that the malware itself is connected to the network is usually a regular site, such as a general search engine.

Therefore, if all of communication destinations of malware are treated as communication destinations not to be accessed by general users, the general users become unable to access regular sites, such as search engines, for example. That is, communications destinations of malware are difficult to be utilized in dealing with the malware in the network. Accordingly, a technique for identifying a malware distribution site is desired.

Techniques disclosed herein have been made in view of the above and an aim thereof is to identify a distribution destination of malware.

Solution to Problem

An information processing apparatus disclosed herein includes an adding unit and an identifying unit. The adding unit adds, to data received from a communication destination device by a program to be analyzed, a tag, by which the communication destination device is identifiable. The identifying unit determines, when an activation of or an activation reservation for a new program is detected, whether or not the tag has been added to data executed by the new program, and identifies the communication destination device identified by the tag.

Advantageous Effects of Invention

According to an aspect of an information processing apparatus disclosed herein, an effect of being able to identify a distribution destination of malware is achieved.

BRIEF DESCRIPTION OF DRAWINGS

FIG. 7 is a diagram illustrating that information processing by an identifying program for executing processing by a computer system is specifically realized by use of a computer.

DESCRIPTION OF EMBODIMENTS

Hereinafter, embodiments of disclosed information processing apparatus and identifying method will be described in detail, based on the drawings. The disclosed invention is not limited by the embodiments.

First Embodiment

Figure 1:
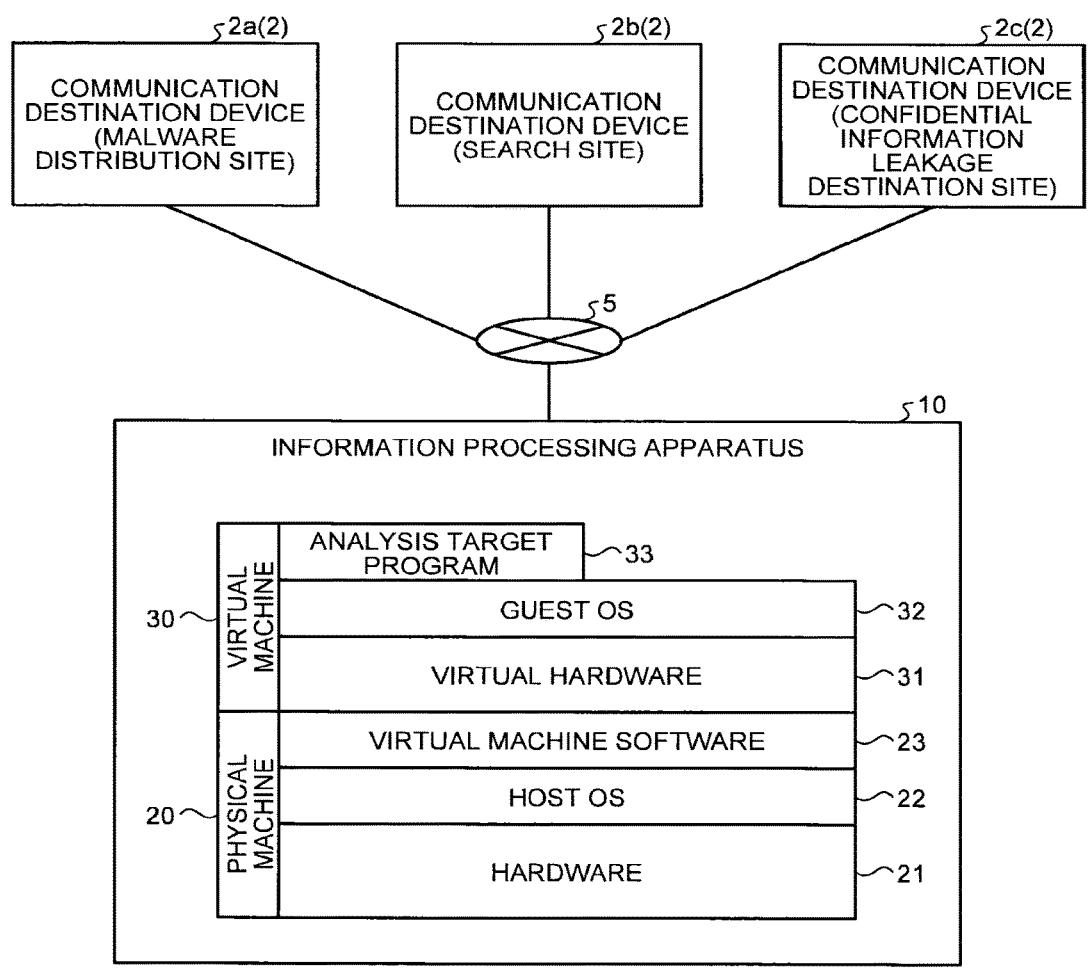
FIG. 1 is a diagram illustrating an example of a configuration of an information processing apparatus.

FIG. 1 is a diagram illustrating an example of a configuration of an information processing apparatus 10. As illustrated in FIG. 1, the information processing apparatus 10 has a physical machine 20 and a virtual machine 30. The physical machine 20 has hardware 21, a host operating system (OS) 22, and virtual machine software 23.

The hardware 21 is an electronic circuit and a peripheral device constituting the information processing apparatus 10 and is, for example, a memory, a central processing unit (CPU), and the like. Further, the hardware 21 stores therein an image file of a disk storing therein an analysis target program 33 described later and an environment for performing that analysis. That is, the hardware 21 stores therein an image of a guest OS 32 to be activated on the virtual machine 30. The guest OS 32 will be described later.

The host OS 22 is an OS that becomes a basis for operating the virtual machine 30 and is executed by use of the hardware 21. The virtual machine software 23 is software that provides the virtual machine 30 by use of the hardware 21 and herein, the virtual machine software 23 causes the virtual machine 30 to operate. For example, the virtual machine software 23 causes the virtual machine 30 to operate by assigning virtual hardware 31 including a virtual disk, a virtual memory, a virtual CPU, and the like, to the guest OS 32.

The virtual machine 30 has, for example, the virtual hardware 31, the guest OS 32, and the analysis target program 33. The virtual hardware 31 is a virtual information processing device that executes various types of processing by operating the guest OS 32 by using the virtual disk, a virtual physical memory, the virtual CPU, and the like provided by the virtual machine software 23. The guest OS 32 operates the analysis target program 33. The analysis target program 33 is a program or an application to be analyzed in the information processing apparatus 10 and is, for example, malware.

In the example illustrated in FIG. 1, the information processing apparatus 10 is connected, via an arbitrary network 5, to communication destination devices 2a to 2c. Herein, it is assumed that the communication destination device 2a is a malware distribution site, the communication destination device 2b is a search site, and the communication destination device 2c is a confidential information leakage destination site. The malware distribution site is a device that transmits data to the malware. The search site is, for example, a device that includes a search engine, and is used to confirm connection of communication by the malware. The confidential information leakage destination site is a device that receives, for example, confidential information, obtained by the malware. The malware distribution site and the confidential information leakage destination site may be the same site. Further, hereinafter, when the communication destination devices 2a to 2c are generally referred to without being distinguished, they will be referred to as communication destination devices 2. The number of communication destination devices 2 connected to the information processing apparatus 10 is not limited to the number illustrated in FIG. 1.

In this configuration, the virtual machine 30 of the information processing apparatus 10 adds, to data received from the communication destination device 2 by the analysis target program 33, a taint tag, by which the communication destination device 2 is able to be identified. If a taint tag has been added to data executed by a new program when an activation of or an activation reservation for the new program is detected, the virtual machine 30 identifies the communication destination device 2 identified by that taint tag to be a malware distribution site.

Figure 2:
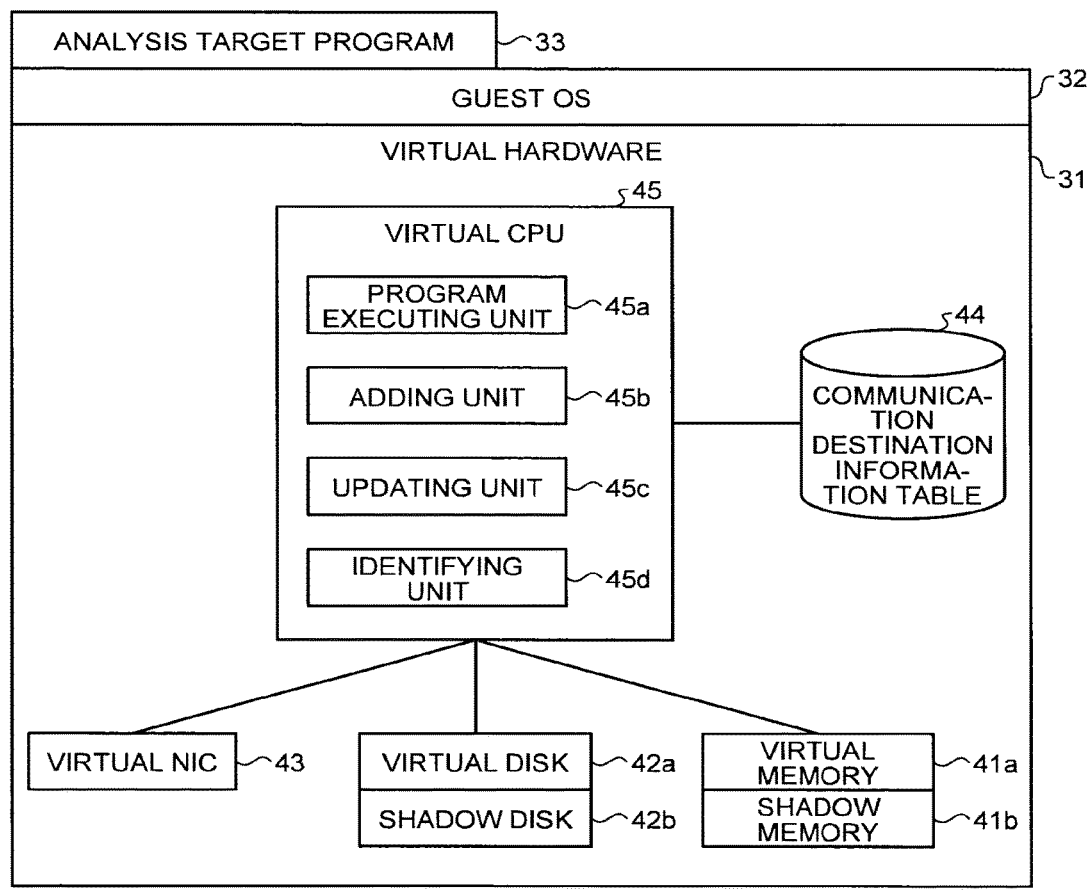
FIG. 2 is a functional block diagram illustrating a configuration of virtual hardware.

Next, by use of FIG. 2, a functional configuration of the virtual hardware 31 illustrated in FIG. 1 will be described. FIG. 2 is a functional block diagram illustrating the configuration of the virtual hardware 31. The virtual hardware 31 is a virtual information processing device that executes various types of processing by operating the guest OS 32, and has a virtual memory 41a, a shadow memory 41b, a virtual disk 42a, a shadow disk 42b, a virtual network interface card (NIC) 43, a communication destination information table 44, and a virtual CPU 45. The virtual memory 41a, the shadow memory 41b, the virtual disk 42a, the shadow disk 42b, the virtual NIC 43, the communication destination information table 44, the virtual CPU 45, and the like are provided from the virtual machine software 23.

The virtual memory 41a is a virtual memory realized by a predetermined area in a physical memory, which the information processing apparatus 10 has, the predetermined area being assigned as a memory used by the guest OS 32 that operates in the virtual machine 30. For example, the virtual memory 41a stores therein a program and data read out from the virtual disk 42a by the virtual CPU 45.

The shadow memory 41b is a data structure storing therein positional information associating, information identifying a storage position on the virtual memory 41a where data are stored, with a taint tag indicating that the data are a target to be monitored. For example, the shadow memory 41b may have a simple array structure, or may be structured to hold the taint tag in a tree structure. The stored information may have a value as the taint tag or may have a pointer to a data structure caused to hold taint information.

Further, the shadow memory 41b is a data structure that stores therein information identifying a storage position on the virtual memory 41a where an API or a system call is stored, in association with breakpoint information. The "breakpoint information" referred to herein is information indicating that a process generated by the analysis target program 33 is to be stopped and processing for analysis is to be executed. Specifically, the breakpoint information includes: communication information indicating that the API or system call is for communication; and activation information indicating that the API or system call is for an activation of a new program or an activation reservation for the program. The breakpoint information is set by a user beforehand.

Further, the API and system call stored in the shadow memory 41b include: a standard API for network communication; a system call and a standard API that perform an activation of or an activation reservation for a new program, and the like. More specifically, if, for example, the OS is Windows (registered trademark), the system call that executes an activation of or an activation reservation for a new program includes NtCreateProcess, and the standard API that executes an activation of or an activation reservation for a new program includes CreateProcess/WinExec/CreateService. Further, if, for example, the OS is Linux (registered trademark), the system call that executes an activation of or an activation reservation for a new program includes execve, and the standard API that executes an activation of or an activation reservation for a new program includes system/excel.

Further, if the OS is Windows (registered trademark), writing in a startup folder and a particular registry, which are executed upon activation of the OS, is also used for an activation reservation for a new program. Therefore, the shadow memory 41b stores therein information indicating a storage position on the virtual memory 41a where the system call or standard API, which writes in the startup folder and the particular registry executed upon activation of the OS, is stored, in association with activation information (breakpoint information).

Further, the new program may be formed as a dynamic link library. The standard API that loads this dynamic link library includes LoadLibrary (the standard API of Windows (registered trademark)). Therefore, the shadow memory 41b stores therein information indicating a storage position on the virtual memory 41a where the system call or standard API, which loads the dynamic link library, such as LoadLibrary, is stored, in association with activation information (breakpoint information). Hereinafter, the system call or standard API may be referred to as a "monitoring target instruction".

The virtual disk 42a is a virtual disk realized by a predetermined area in a physical disk, which the information processing apparatus 10 has, the predetermined area being assigned as an area used by the guest OS 32 operated in the virtual machine 30. For example, the virtual disk 42a stores therein a program to be executed by the virtual CPU 45, data to be processed by the program, and the like.

The shadow disk 42b is a data structure storing therein positional information associating information identifying a storage position on the virtual disk 42a where data are stored, with a taint tag indicating that the data are a target to be monitored. For example, the shadow disk 42b may have a simple array structure, or may be structured to hold the taint tag in a tree structure. The stored information may have a value as the taint tag or may have a pointer to a data structure caused to hold taint information.

Further, the shadow disk 42b is a data structure storing therein information identifying a storage position on the virtual memory 41a where the API or system call is stored, in association with breakpoint information. The API or system call and the breakpoint information stored in the shadow disk 42b are similar to the API or system call and the breakpoint information stored in the shadow memory 41b and thus detailed description thereof will be omitted.

The virtual NIC 43 is recognized as an NIC by the guest OS 32 and is realized as software operated by a physical CPU. Further, by the virtual NIC 43 controlling a physical NIC, the guest OS 32 is able to communicate with the communication destination device 2 via the physical NIC.

Figure 3:
FIG. 3 is a diagram illustrating an example of information stored in a communication destination information table.

The communication destination information table 44 stores therein information indicating the communication destination device 2 of a transmission source of data, for which a taint tag has been added. In other words, the communication destination information table 44 is for managing the taint tag and the communication destination information in association with each other. FIG. 3 is a diagram illustrating an example of information stored in the communication destination information table 44. As illustrated in FIG. 3, the communication destination information table 44 stores therein information associating "taint tag", "Internet Protocol (IP) version", "transmission source address", "destination address", "IP protocol", "transmission source port number", and "destination port number" in association with one another.

The "taint tag" stored in the communication destination information table 44 indicates an identifier of a taint tag. For example, a data value, such as "1" or "2", is stored in the "taint tag". Further, the "IP version" stored in the communication destination information table 44 indicates a version of the IP protocol. For example, a data value, such as "4" indicating that IPv4 is used, is stored in the "IP version". Further, the "transmission source address" stored in the communication destination information table 44 indicates an address of a transmission source device of a packet. For example, a data value, such as "192.168.0.1" or "172.16.0.1", is stored in the "transmission source address". Further, the "destination address" stored in the communication destination information table 44 indicates an address of a receiving device of the packet. In other words, the "destination address" indicates an address assigned to the information processing apparatus 10. For example, "10.0.0.1" is stored in the "destination address". Further, the "IP protocol" stored in the communication destination information table 44 indicates a protocol number. For example, a data value, such as "6", indicating that the IP protocol is Transmission Control Protocol (TCP), or "17", indicating that the IP protocol is User Datagram Protocol (UDP), is stored in the "IP protocol". Further, the "transmission source port number" stored in the communication destination information table 44 indicates a port number identifying a program of the transmission source. For example, a data value, such as "80" or "20000", is stored in the "transmission source port number". Further, the "destination port number" stored in the communication destination information table 44 indicates a port number identifying a program of the recipient. For example, a data value, such as "10000" or "10001", is stored in the "destination port number".

For example, the communication destination information table 44 illustrated in FIG. 3 indicates that data added with a taint tag, "1", have been received from a device having a transmission source address, "192.168.0.1", with a protocol of IPv4 via communication in the TCP layer. The "transmission source port number" and "destination port number" are obtained only when the IP protocol is "6" or "17".

The virtual CPU 45 is a virtual CPU realized by a predetermined processing capacity in a physical CPU, which the information processing apparatus 10 has, the predetermined processing capacity being assigned as a CPU used by the guest OS 32 that operates in the virtual machine 30. The virtual CPU 45 has, for example, a program executing unit 45a, an adding unit 45b, an updating unit 45c, and an identifying unit 45d.

Further, the virtual CPU 45 has a virtual register and a shadow register, which are not illustrated. The virtual register is a virtual register realized by a predetermined area in a physical register, a physical memory, and a physical disk, which the information processing apparatus 10 has, the predetermined area being assigned as an area used by the guest OS 32 that operates in the virtual machine 30. For example, the virtual register stores therein a program and data read out from the virtual memory 41a by the virtual CPU 45. Further, the shadow register is a data structure storing therein positional information associating information identifying a storage position on the virtual register where data are stored, with a taint tag indicating that the data are a target to be monitored.

Further, the shadow register is a data structure storing therein information identifying a storage position on the virtual register where the API or system call is stored, in association with the breakpoint information. The API or system call and the breakpoint information stored in the shadow register are similar to the API or system call and the breakpoint information stored in the shadow memory 41b and thus detailed description thereof will be omitted.

The program executing unit 45a is a processing unit that executes a program stored in the virtual disk 42a. For example, the program executing unit 45a reads out the program from the virtual disk 42a and expands it into the virtual memory 41a. That is, the program executing unit 45a executes the program to be executed stored in the virtual memory 41a after reading out the program to be executed from the virtual disk 42a and storing it into the virtual memory 41a.

The adding unit 45b adds, to data received from the communication destination device 2 by the analysis target program 33, a tag, by which the communication destination device 2 is identifiable. For example, when reception of a packet by the virtual NIC 43 is detected, the adding unit 45b obtains communication destination information from the packet and generates a taint tag that is not present in the communication destination information table 44. The adding unit 45b then stores the communication destination information and the taint tag in association with each other into the communication destination information table 44. Further, when data included in the received packet are extracted and are copied into the virtual memory 41a, the adding unit 45b stores the taint tag into the shadow memory 41b corresponding to the virtual memory 41a to be written. The data extracted from the packet include a program and data referred to by the program. Hereinafter, the program and the data referred to by the program will be simply referred to as "data".

Figure 4:
FIG. 4 is a diagram for explaining processing operation by an adding unit.

By use of FIG. 4, processing operation by the adding unit 45b will be described. FIG. 4 is a diagram for explaining the processing operation by the adding unit 45b. In an example illustrated in FIG. 4, a case where new communication destination information is stored into the communication destination information table 44 illustrated in FIG. 3 will be described. The adding unit 45b obtains communication destination information and generates a taint tag. Since "1" to "5" have been used as taint tags in the example illustrated in FIG. 3, the adding unit 45b generates, as a new taint tag, "6". If a record with the same communication destination information is present in the communication destination information table 44, the adding unit 45b may use the taint tag of this record.

The adding unit 45b stores the communication destination information (herein, the IP version, the transmission source address, the destination address, the IP protocol, the transmission source port number, and the destination port number) in association with the taint tag (herein, "6"), into the communication destination information table 44. In the example illustrated in FIG. 4, the adding unit 45b stores the IP version, "4", the transmission source address, "192.168.3.1", the destination address, "10.0.0.1", the IP protocol, "6", the transmission source port number, "80", and the destination port number, "10003", which are the communication destination information, in association with the taint tag, "6", into the communication destination information table 44.

The updating unit 45c updates, according to flow of data, the positional information associating the information indicating the storage position of the data with the tag. For example, when data are copied and stored into another storage area or moved to another storage area while the program executing unit 45a is executing the analysis target program 33, the updating unit 45c stores the taint tag in association with the storage position in the storage area to which the data are copied or moved. The "storage area" referred to herein includes the virtual register, the virtual memory 41a, and the virtual disk 42a.

More specifically, if copying of data between the virtual register and the virtual memory 41a and between the virtual memory 41a and the virtual disk 42a or an arithmetic instruction is caused while the analysis target program 33 is being executed, the updating unit 45c stores, in association with the storage position of the storage area to which the data are copied or moved, the taint tag, into the shadow register, shadow memory 41b, and shadow disk 42b corresponding to each storage area. In other words, the updating unit 45c propagates the taint tag with respect to the storage position of the storage area to which the data are copied or moved. Hereinafter, the shadow register, the shadow memory 41b, and the shadow disk 42b may be referred to together as a shadow area.

Further, if copying or movement of an API or a system call occurs during execution of the analysis target program 33, the updating unit 45c stores, in association with the storage position of the storage area to which the API or system call is copied or moved, the breakpoint information, into the shadow area corresponding to each storage area. In other words, the updating unit 45c propagates the breakpoint information with respect to the storage position of the storage area to which the API or system call is copied or moved.

If an activation of, or an activation reservation for, a new program is detected, the identifying unit 45d determines whether or not a taint tag has been added to data executed by the new program, and if the taint tag has been added thereto, the identifying unit 45d identifies the communication destination device 2 identified by the taint tag. For example, the identifying unit 45d monitors, at all times, activation of, or activation reservation for, a new program, while the program executing unit 45a is executing the analysis target program 33. An activation of or an activation reservation for a new program may be implemented via the system call or standard API provided by the guest OS 32. Thus, the identifying unit 45d determines whether or not activation information (breakpoint information) has been set in association with a storage position of the system call or standard API called by the analysis target program 33, for example. If the activation information (breakpoint information) has been set in association with the storage position of the system call or standard API, the identifying unit 45d detects that an activation of or an activation reservation for a new program has been implemented.

Further, if the implementation of an activation of or an activation reservation for a new program has been detected, the identifying unit 45d determines whether or not a corresponding taint tag is present in a shadow area corresponding to a storage area of the program that is newly executed or reserved to be executed. The storage area of the program herein means a file stored in the virtual disk 42a. For example, for WinExec, which is the standard API of Windows (registered trademark), a pointer to a command line is specified as an argument thereof. Further, if an activation of a program is detected, the identifying unit 45*d* determines whether or not a taint tag is present in the shadow area corresponding to the storage area of the program, and if an activation reservation for a program is detected, the identifying unit 45*d* determines whether or not a taint tag is present in the shadow area corresponding to the storage area of the program and the data referred to by the program.

If a taint tag is determined to be present in the shadow area corresponding to the storage area of the program newly executed or reserved to be executed, the identifying unit 45*d* obtains this taint tag. The identifying unit 45*d* then obtains, from the communication destination information table 44, communication destination information corresponding to the taint tag, and identifies the obtained communication destination information to be communication destination information of a malware distribution site.

For example, if the communication destination information table 44 stores therein the information illustrated in FIG. 3 and the taint tag obtained from the shadow area is "4", the identifying unit 45*d* identifies the communication destination information corresponding to the taint tag "4". That is, the identifying unit 45*d* identifies the communication destination device 2 with the address, "192.168.1.1", the protocol, "6", and the port number, "80". The identifying unit 45*d* then provides, to a user, the identified communication destination device 2 as information related to the malware distribution site. If the taint tag is determined to be not present, the identifying unit 45*d* continues to execute the program.

Further, a program newly expanded on a memory may be directly executed by the analysis target program 33 without the system call or standard API (monitoring target instruction). Thus, even if the system call or standard API is not detected to be executed, the identifying unit 45*d* determines whether or not a taint tag has been added in association with a storage position of a machine language instruction that is executed. If it is determined that a taint tag has been added in association with the storage position of the machine language instruction, the identifying unit 45*d* obtains, from the communication destination information table 44, communication destination information corresponding to the taint tag, and identifies the obtained communication destination information to be communication destination information of a malware distribution site.

Figure 5:
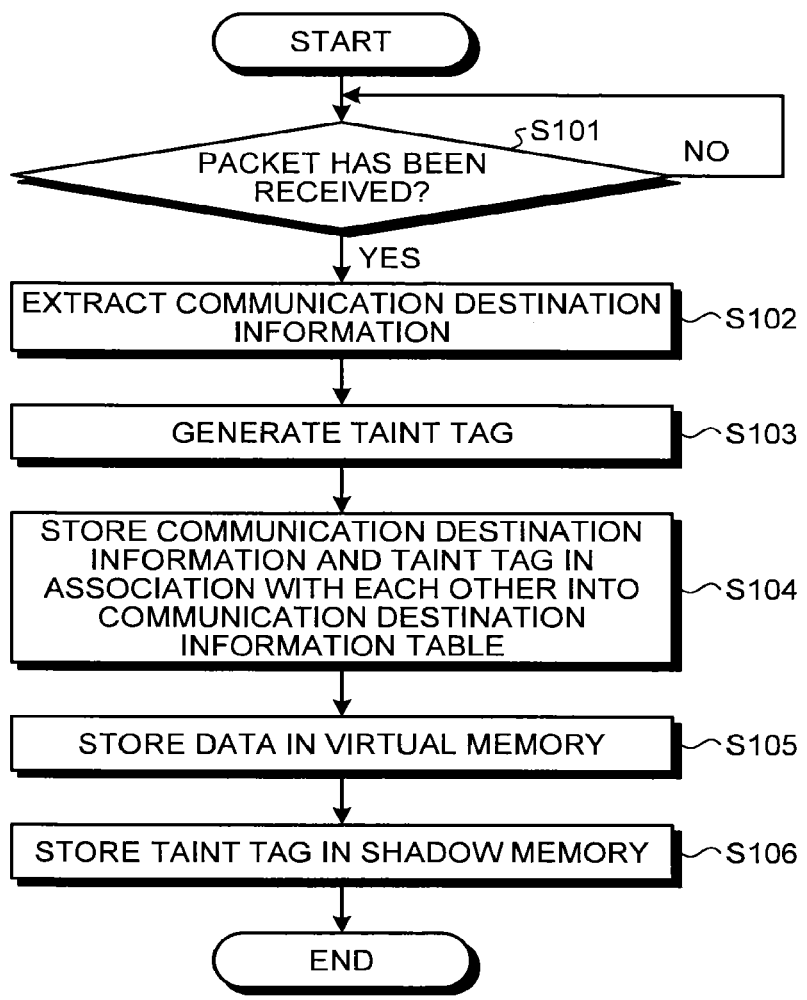
FIG. 5 is a flow chart illustrating a sequence of processing of adding a taint tag by the adding unit.

Next, by use of FIG. 5 and FIG. 6, a sequence of processing by the virtual CPU 45 will be described. FIG. 5 is a flow chart illustrating a sequence of processing of adding a taint tag by the adding unit 45*b*. As illustrated in FIG. 5, the adding unit 45*b* determines whether or not a packet has been received (Step S101). If it is determined that a packet has been received (Step S101: Yes), the adding unit 45*b* extracts communication destination information from the received packet (Step S102). If it is determined that a packet has not been received (Step S101: No), the adding unit 45*b* repeats the determination processing of Step S101.

The adding unit 45*b* generates a taint tag after the processing of Step S102 (Step S103). The adding unit 45*b* then stores the communication destination information in association with the taint tag into the communication destination information table 44 (Step S104). Further, the adding unit 45*b* stores the received data into the virtual memory 41*a* (Step S105) and stores the taint tag into the shadow memory 41*b* (Step S106).

Figure 6:
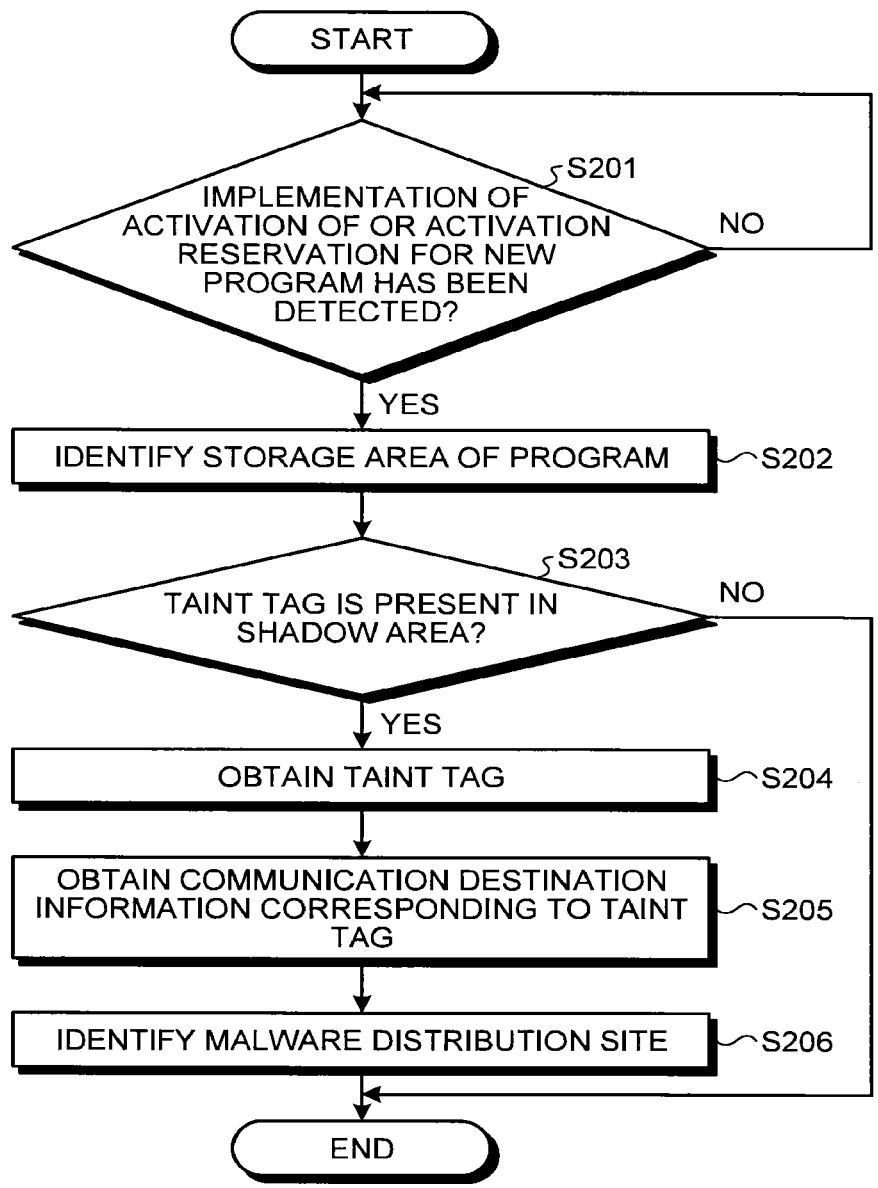
FIG. 6 is a flow chart illustrating a sequence of processing of identifying a malware distribution site by an identifying unit.

FIG. 6 is a flow chart illustrating a sequence of processing of identifying a malware distribution site by the identifying unit 45*d*. As illustrated in FIG. 6, the identifying unit 45*d* determines whether or not implementation of an activation of or an activation reservation for a new program has been detected (Step S201). If implementation of an activation of or an activation reservation for a new program has been detected (Step S201: Yes), the identifying unit 45*d* identifies a storage area of the program (Step S202). If implementation of an activation of or an activation reservation for a new program has not been detected (Step S201: No), the identifying unit 45*d* repeats the determination processing of Step S201.

After the processing of Step S202, the identifying unit 45*d* determines whether or not a taint tag is present in the shadow area (Step S203). If it is determined that a taint tag is present in the shadow area (Step S203: Yes), the identifying unit 45*d* obtains the taint tag (Step S204). If it is determined that a taint tag is not present in the shadow area (Step S203: No), the identifying unit 45*d* ends the processing.

After the processing of Step S204, the identifying unit 45*d* refers to the communication destination information table 44 and obtains communication destination information corresponding to the taint tag (Step S205). The identifying unit 45*d* then identifies a malware distribution site (Step S206).

As described above, in the information processing apparatus 10 according to the first embodiment, the virtual CPU 45 adds, to data received from a communication destination device by a program to be analyzed, a taint tag, by which the communication destination device is identifiable. If a taint tag has been added to data executed by a new program when an activation of or an activation reservation for the new program is detected, the virtual CPU 45 identifies the communication destination device 2 identified by the taint tag.

Types of malware include those that download and execute new malware in order to add functions or fix bugs. Moreover, communication destinations of malware are diverse, and include, not only download sources of new malware, but also servers distributing instructions from information leakage destinations and attackers. According to the first embodiment, if the analysis target program 33 downloads a new program via a network, the communication destination device 2, which is a download source of that program, is identified. That is, according to the first embodiment, by analyzing malware, a host distributing new malware is able to be identified.

Further, communication destination information that is able to be obtained in the virtual NIC 43 is generally limited to information of Layer 2 (Ethernet (registered trademark) or the like). From the information obtained from Layer 2, a uniform resource locator (URL) may be difficult to be restored. For a URL used in HyperText Transfer Protocol (HTTP) communication, for example, after name resolution is performed with respect to a host name portion, communication is performed by use of an IP address. Accordingly, by monitoring the API of the HTTP communication, a URL is able to be obtained as communication destination information. That is, the communication destination information obtained in the communication API may be more preferable than the communication destination information obtainable in the virtual NIC 43. Therefore, in the above described embodiment, although the case has been described, where the adding unit 45*b* obtains the communication destination information when the virtual NIC 43 receives a packet, immediately after the standard API for network communication provided by the OS or the like is called, communication destination information corresponding to that API may be obtained.

In that case, when the API is called by the analysis target program 33, the adding unit 45b determines whether or not communication information (breakpoint information) has been stored in association with the storage position of the called API. If the communication information (breakpoint information) has been stored in association with the storage position of the called API, the adding unit 45b detects a call for the communication API. The adding unit 45b then obtains communication destination information from the communication API. The adding unit 45b then stores the obtained communication destination information into the communication destination information table 44.

Second Embodiment

The embodiment of the present invention has been described, but in addition to the above described embodiment, the present invention may be implemented in other embodiments. Hereinafter, the other embodiments will be described.

(System Configuration)

Of the processing described in the embodiment, all or a part of the processing described as being performed automatically may be performed manually, or all or a part of the processing described as being performed manually may be performed automatically by a known method. In addition, the sequences of the processing, the control sequences, the specific names, and the information including the various data and parameters (for example, FIG. 1 to FIG. 6) described above and illustrated in the drawings may be arbitrarily modified unless otherwise specified.

Further, each element of the respective devices has been functionally and conceptually illustrated in the drawings and is not necessarily configured physically as illustrated in the drawings. That is, a specific mode of separation and integration of the respective devices is not limited only to those illustrated in the drawings, and all or a part thereof may be configured by functionally or physically separating or integrating in arbitrary units depending on various loads and use situations.

(Program)

Further, an identifying program may be generated, which describes the processing executed by the information processing apparatus according to the first embodiment in a language executable by a computer. In this case, by the computer executing the identifying program, the same effects as those of the above described embodiment are able to be obtained. Moreover, processing similar to that of the above described embodiment may be realized by recording the identifying program in a computer readable recording medium and causing a computer to load and execute the identifying program recorded in this recording medium. Hereinafter, an example of a computer that executes the identifying program realizing the same functions as those of the information processing apparatus 10 illustrated in FIG. 1 and the like will be described.

FIG. 7 is a diagram illustrating a computer 1000 that executes the identifying program. As illustrated in FIG. 7, the computer 1000 has, for example, a memory 1010, a CPU 1020, a hard disk drive interface 1030, a disk drive interface 1040, a serial port interface 1050, a video adapter 1060, and a network interface 1070. These units are connected to one another by a bus 1080.

The memory 1010 includes a read only memory (ROM) 1011 and a RAM 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. Into the disk drive 1100, for example, an attachable and detachable storage medium, such as a magnetic disk or an optical disk, is inserted. To the serial port interface 1050, for example, a mouse 1110 and a keyboard 1120 are connected. To the video adapter 1060, for example, a display 1130 is connected.

As illustrated in FIG. 7, the hard disk drive 1090 stores therein, for example, an OS 1091, an application program 1092, a program module 1093, and program data 1094. The identifying program described in the above described embodiment is stored in, for example, the hard disk drive 1090 or the memory 1010.

Further, the identifying program is stored as, for example, a program module in which instructions executed by the computer 1000 are described, in, for example, the hard disk drive 1090. Specifically, a program module, in which an adding procedure for executing the same information processing as that of the adding unit 45b described in the above described embodiment and an identifying procedure for executing the same information processing as that of the identifying unit 45d are described, is stored in the hard disk drive 1090.

Further, data used in the information processing by the identifying program are stored, as program data, for example, in the hard disk drive 1090. The CPU 1020 then reads out, as necessary, the program module and program data stored in the hard disk drive 1090 into the RAM 1012, and executes each of the above described procedures.

The program module and program data related to the identifying program may be, for example, stored in an attachable and detachable storage medium and read out by the CPU 1020 via the disk drive 1100 or the like, not being limited to the case of being stored in the hard disk drive 1090. Or, the program module and program data related to the identifying program may be stored in another computer connected via a network, such as a local area network (LAN) or a wide area network (WAN), and read out by the CPU 1020 via the network interface 1070.

(Others)

The identifying program described in the embodiments may be distributed via a network, such as the Internet. Further, the identifying program may be executed by being recorded in a computer readable recording medium, such as a hard disk, a flexible disk (FD), a CD-ROM, an MO, or a DVD, and being read out from the recording medium by a computer.

REFERENCE SIGNS LIST

10 INFORMATION PROCESSING APPARATUS
20 PHYSICAL MACHINE
21 HARDWARE
22 HOST OS
23 VIRTUAL MACHINE SOFTWARE
30 VIRTUAL MACHINE
31 VIRTUAL HARDWARE
32 GUEST OS
33 ANALYSIS TARGET PROGRAM
41a VIRTUAL MEMORY
41b SHADOW MEMORY
42a VIRTUAL DISK
42b SHADOW DISK
43 VIRTUAL NIC
44 COMMUNICATION DESTINATION INFORMATION TABLE

45 VIRTUAL CPU
45a PROGRAM EXECUTING UNIT
45b ADDING UNIT
45c UPDATING UNIT
45d IDENTIFYING UNIT
1000 COMPUTER
1010 MEMORY
1011 ROM
1012 RAM
1020 CPU
1030 HARD DISK DRIVE INTERFACE
1040 DISK DRIVE INTERFACE
1050 SERIAL PORT INTERFACE
1060 VIDEO ADAPTER
1070 NETWORK INTERFACE
1080 BUS
1090 HARD DISK DRIVE
1091 OS
1092 APPLICATION PROGRAM
1093 PROGRAM MODULE
1094 PROGRAM DATA
1100 DISK DRIVE
1110 MOUSE
1120 KEYBOARD
1130 DISPLAY

The invention claimed is:

1. An information processing apparatus, comprising:
a communication network interface;
a memory; and
processing circuitry configured to:
when a data packet has been received at the communication network interface,
extract identification information of a communication destination device from the data packet of a communication destination device which is the source of the data packet and store the identification information of the communication destination device in a first area of the memory in association with a tag,
store application data included in the data packet in a second area of the memory, and
generate positional information associating information indicating a storage position in the second area of the memory of the application data with the tag,
wherein when an activation of or an activation reservation for a particular monitored program is detected and the stored application data is executed by the monitored program, the processing circuitry identifies the communication destination device identified in association with the tag in the first area of the memory as a malware distribution site, and
when communication information indicating that a monitored target instruction for communication is stored in association with a storage position in an area of the memory, and when the monitored target instruction is called by the monitored program, the processing circuitry extracts identification information of a communication destination device from the called monitored target instruction and stores the identification information of the communication destination device in a first area of the memory in association with a tag,
wherein the monitored program is predetermined as a malware program to be analyzed in the information processing apparatus.

2. The information processing apparatus according to claim 1, the processing circuitry being further configured to update, according to flow of the data, the positional information.

3. The information processing apparatus according to claim 1, wherein when activation information indicating that a monitored target instruction is for an activation of a program or for an activation reservation for a program is stored in association with a storage position in an area of the memory of the monitoring target instruction when the monitoring target instruction is called, the processing circuitry detects an activation of or an activation reservation for a program.

4. The information processing apparatus according to claim 1, wherein when the tag has been added in association with a storage position of an executed machine language instruction an area of the memory, the processing circuitry identifies the communication destination device identified by the tag.

5. An identifying method, implemented on an information processing apparatus that includes a communication network interface; a memory; and processing circuitry, the method comprising:
when a data packet has been received at the communication network interface,
extracting identification information of a communication destination device from the data packet of a communication destination device which is the source of the data packet and storing the identification information of the communication destination device in a first area of the memory in association with a tag;
storing application data included in the data packet in a second area of the memory; and
generating positional information associating information indicating a storage position in the second area of the memory of the application data with the tag,
wherein when an activation of or an activation reservation for a particular monitored program is detected and the stored application data is executed by the monitored program, the method includes identifying the communication destination device identified in association with the tag in the first area of the memory as a malware distribution site, and
when communication information indicating that a monitored target instruction for communication is stored in association with a storage position in an area of the memory, and when the monitored target instruction is called by the monitored program, the method includes extracting identification information of a communication destination device from the called monitored target instruction and storing the identification information of the communication destination device in a first area of the memory in association with a tag,
wherein the monitored program is predetermined as a malware program to be analyzed in the information processing apparatus.

6. The information processing apparatus according to claim 1, wherein the information processing apparatus includes a physical machine that includes a host operating system and a virtual machine that includes a guest operating system, and the processing circuitry is configured to activate the monitored program via guest operating system of the virtual machine, and the first area and the second area of the memory are designated for the virtual machine.

* * * * *